US009341097B2

(12) United States Patent
Bays et al.

(10) Patent No.: US 9,341,097 B2
(45) Date of Patent: May 17, 2016

(54) REDUCTANT MATERIAL DEPOSIT REDUCTION IN EXHAUST AFTERTREATMENT SYSTEMS (71) Applicant: Cummins Inc., Columbus, IN (US)

(72) Inventors: Mark Bays, Columbus, IN (US); Ian A. Package, Columbus, IN (US); Upendra Deshmukh, Columbus, IN (US); Douglas Mitchell, Columbus, IN (US); Jason Drost, Edgerton, WI (US); Mihai Chiruta, Madison, WI (US); Joseph Brault, Columbus, IN (US)

(73) Assignee: Cummins Inc., Columbus, IN (US)

( * ) Notice: Subject to any disclaimer, the term of this patent is extended or adjusted under 35 U.S.C. 154(b) by 86 days.

(21) Appl. No.: 14/151,133

(22) Filed: Jan. 9, 2014

(65) Prior Publication Data
US 2014/0260202 A1 Sep. 18, 2014

Related U.S. Application Data (60) Provisional application No. 61/790,875, filed on Mar. 15, 2013.

(51) Int. Cl.
*F01N 3/00* (2006.01)
*F01N 3/18* (2006.01)
*F01N 3/20* (2006.01)
*F01N 3/28* (2006.01)
*B01F 5/02* (2006.01)
(Continued)

(52) U.S. Cl.
CPC .............. *F01N 3/18* (2013.01); *B01F 3/04049* (2013.01); *B01F 5/0268* (2013.01); *B01F 5/0473* (2013.01); *B01F 5/0618* (2013.01); *F01N 3/2066* (2013.01); *F01N 3/2892* (2013.01); *B01F 2005/0639* (2013.01); *F01N 2240/20* (2013.01); *F01N 2610/1453* (2013.01); *Y02T 10/24* (2013.01)

(58) Field of Classification Search
CPC ....... F01N 3/18; F01N 3/2066; F01N 3/2892; B01F 5/0473; B01F 5/0618; B01F 3/04049; B01F 5/0268
USPC ........................................................ 60/274
See application file for complete search history.

(56) References Cited

U.S. PATENT DOCUMENTS

| 5,320,428 A | 6/1994 | Streiff |
| 5,820,832 A | 10/1998 | Huttenhofer et al. |

(Continued)

FOREIGN PATENT DOCUMENTS

| EP | 1748162 | 1/2007 |
| WO | 2005073524 | 8/2005 |

(Continued)

*Primary Examiner* — Jason Shanske
(74) *Attorney, Agent, or Firm* — Taft Stettinius & Hollister LLP (57) ABSTRACT In one non-limiting embodiment, an apparatus for treating exhaust includes a reductant injector, an aftertreatment component including a $NO_x$ reduction catalyst, and a pathway for directing exhaust to the aftertreatment component. The pathway includes a constriction zone within which is positioned a mixing member. The constriction zone begins downstream of the reductant injector and upstream from the aftertreatment component. However, other embodiments, forms and applications are also envisioned.

31 Claims, 8 Drawing Sheets (51) Int. Cl.
B01F 5/04 (2006.01)
B01F 5/06 (2006.01)
B01F 3/04 (2006.01)

(56) References Cited

U.S. PATENT DOCUMENTS

| | | | |
|---|---|---|---|
| 5,953,909 A * | 9/1999 | Waltrip, III | 60/275 |
| 6,074,619 A | 6/2000 | Schoubye | |
| 6,553,755 B2 | 4/2003 | Hofmann et al. | |
| 6,905,658 B2 | 6/2005 | Rogers et al. | |
| 7,581,387 B2 | 9/2009 | Bui et al. | |
| 7,941,995 B2 * | 5/2011 | Goss et al. | 60/322 |
| 2010/0074814 A1 | 3/2010 | Dorst | |
| 2010/0083641 A1 | 4/2010 | Makartchouk et al. | |
| 2010/0098604 A1 * | 4/2010 | Drost et al. | 422/225 |
| 2011/0094206 A1 * | 4/2011 | Liu et al. | 60/274 |

FOREIGN PATENT DOCUMENTS

| | | |
|---|---|---|
| WO | 2008034981 | 3/2008 |
| WO | 2009024815 | 2/2009 |

* cited by examiner

REDUCTANT MATERIAL DEPOSIT REDUCTION IN EXHAUST AFTERTREATMENT SYSTEMS

CROSS-REFERENCE TO RELATED APPLICATIONS

The present application claims the benefit of U.S. Provisional Patent Application No. 61/790,875, filed on Mar. 15, 2013, which is hereby incorporated by reference in its entirety.

BACKGROUND

The technical field generally relates to internal combustion engine aftertreatment systems. Many current powertrain systems include an aftertreatment system in the exhaust of internal combustion engines to meet emissions regulations or to reduce emissions of undesirable exhaust gas constituents. Aftertreatment systems often include multiple components, including particulate filters, oxidation catalysts, $NO_x$ adsorbers, $NO_x$ reduction catalysts, three-way catalysts, four-way catalysts, and can further include multiple components of the same type at various locations along the aftertreatment system flowpath. One well known way of removing oxides of nitrogen ($NO_x$) from engine exhaust is Selective Catalyst Reduction (SCR). In this system a catalyst is used to facilitate a reaction between $NO_x$ molecules and a reductant to convert the $NO_x$ into common atmospheric gasses. One type of reductant that can be used in these systems is ammonia, which can be delivered by injecting an aqueous solution of urea into the exhaust stream in a component commonly referred to as a decomposition pipe. The decomposition pipe typically includes a mixing device to improve the uniformity of the reductant dispersion in the exhaust gas and a gas flow passage of some length to provide for residence time of the reductant in the exhaust gas. When an aqueous solution of urea is used as the reductant, heat from the exhaust gas evaporates water from the urea and provides the activation energy needed to chemically decompose the urea. Once heated to a sufficient temperature for a sufficient duration of time, urea is completely converted to ammonia and gaseous ammonia precursors.

A range of temperatures exists where urea decomposition will start; however, some of the urea will not completely decompose to gaseous products, but rather will only partially decompose, which results in solid products. If this partial decomposition happens to urea when it is present on a solid surface, such as a mixer element or decomposition pipe wall, the solid decomposition products can adhere to the surface, creating a deposit. Additionally, a different range of temperatures exists that are warm enough to cause water from the urea to evaporate, but where the temperature is insufficient to start rapid decomposition of urea. This condition can also result in a deposit of liquid or solid urea.

These deposits can cause several issues such as reduced SCR efficiency due to poor reductant distribution, increased exhaust restriction and eventually excess exhaust concentration of ammonia due to deposit break down when exhaust temperature increases.

Therefore, further improvements in this area of technology are desirable.

SUMMARY

One embodiment is a unique apparatus for treating exhaust and more particularly, but not exclusively, for reducing and/or preventing reductant material deposits in one or more exhaust aftertreatment components. Further embodiments, forms, objects, features, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
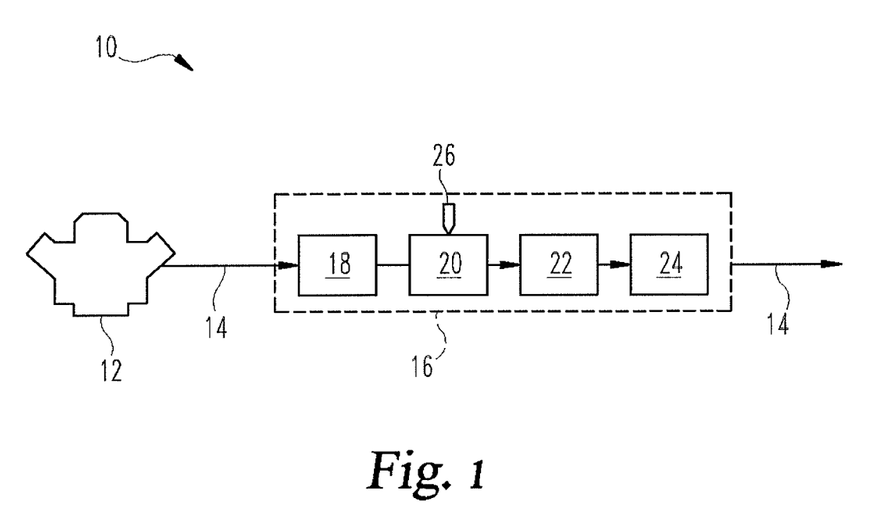
FIG. 1 is a schematic illustration of a non-limiting form of an exhaust aftertreatment system.

FIG. 1 is a schematic illustration of a system 10 that includes an internal combustion engine 12 fluidly coupled to an exhaust gas flowpath 14, and an aftertreatment system 16 disposed in exhaust gas flowpath 14. In the illustrated form, aftertreatment system 16 includes a particulate filter 18, a decomposition pipe 20, a $NO_x$ reduction catalyst 22, and an ammonia oxidation catalyst 24. Aftertreatment system 16 also includes a reductant injector 26 that is coupled with decomposition pipe 20 and configured to inject a reductant (e.g. urea, an aqueous solution of urea, a hydrocarbon, and/or ammonia) into exhaust gas flowpath 14 upstream of $NO_x$ reduction catalyst 22 at appropriate times during operation of system 10. It should be further appreciated that system 10 and/or aftertreatment system 16 may include one or more components in addition to or in lieu of those illustrated, and that the components could be provided in one or more arrangements other than that illustrated in FIG. 1. For example, in one non-limiting form, aftertreatment system 16 may be configured such that particulate filter 18 is absent and only decomposition pipe 20, reductant injector 26 and any additional tubing or piping, if present, are positioned between internal combustion engine 12 and $NO_x$ reduction catalyst 22. In a further variant of this form, it is also contemplated that $NO_x$ reduction catalyst 22 may be the last downstream component of aftertreatment system 16.

System 10 may also include a variety of sensors, including one or more temperature sensors which can be positioned upstream of aftertreatment system 16, between particulate filter 18 and $NO_x$ reduction catalyst 22, and/or downstream of aftertreatment subsystem 16. System 10 may also include one or more $NO_x$ sensors which can be positioned upstream of $NO_x$ reduction catalyst 22 and/or downstream of ammonia oxidation catalyst 24. The selection and location of sensors are not limiting, and a variety of sensor arrangements are contemplated and may be dependent on the particular configuration of the different variations of system 10 and/or aftertreatment system 16. System 10 may also include one or more of a turbocharger, an EGR system, an engine control unit (ECU), or an injector upstream of particulate filter 18 that injects hydrocarbons to assist in regenerating particulate filter 18.

In the illustrated form, decomposition pipe 20 is positioned between particulate filter 18 and $NO_x$ reduction catalyst 22 and is configured, either alone or in combination with one or more other segments of exhaust piping or tubing, to direct exhaust gas in exhaust gas flowpath 14 from particulate filter 18 to $NO_x$ reduction catalyst 22. In one form, all or substantially all of the exhaust gas in exhaust gas flowpath 14 exiting particulate filer 18 is directed to $NO_x$ reduction catalyst 22 through decomposition pipe 20, although forms in which a portion of the exhaust gas exiting particulate filter 18 is not directed through decomposition pipe 20 are also possible. In other non-illustrated forms in which particulate filter 18 is absent, decomposition pipe 20 is positioned between internal combustion engine 12 and $NO_x$ reduction catalyst 22 and is configured, either alone or in combination with one or more other segments of exhaust piping or tubing, to direct exhaust gas in exhaust gas flowpath 14 from internal combustion engine 12 to $NO_x$ reduction catalyst 22.

Referring now generally to FIGS. 2-6, further details regarding one non-limiting embodiment of a decomposition pipe 21 that can be used in system 10 will be provided. More particularly, decomposition pipe 21 includes an elongate body 28 extending along a longitudinal axis L between an upstream end 29 and an oppositely positioned downstream end 30. In the illustrated form, elongate body 28 includes a generally linear configuration between upstream end 29 and downstream end 30, although forms in which elongate body 28 includes one or more curved portions between upstream and downstream ends 29, 30 are also possible. Elongate body 28 includes a flange 31 at upstream end 29 and a groove 32 positioned adjacent to flange 31. In this configuration, flange 31 and groove 32 can cooperate with corresponding structure on particulate filter 18, internal combustion engine 12, or other coupling elements (not shown) in order to couple upstream end 29 of elongate body 28 with particulate filter 18 or internal combustion engine 12. It should also be appreciated however that upstream end 29 of elongate body 28 may also be coupled with other exhaust piping or tubing positioned between decomposition pipe 21 and particulate filter 18 or between decomposition pipe 21 and internal combustion engine 12. Elongate body 28 also includes a flange 33 at downstream end 30 and a groove 34 positioned adjacent to flange 33. In this configuration, flange 33 and groove 34 can cooperate with corresponding structure on $NO_x$ reduction catalyst 22 or other coupling elements (not shown) in order to couple downstream end 30 of elongate body 28 with $NO_x$ reduction catalyst 22. It should also be appreciated however that downstream end 30 of elongate body 28 may also be coupled with other exhaust piping or tubing positioned between decomposition pipe 21 and $NO_x$ reduction catalyst 22.

Figure 3:
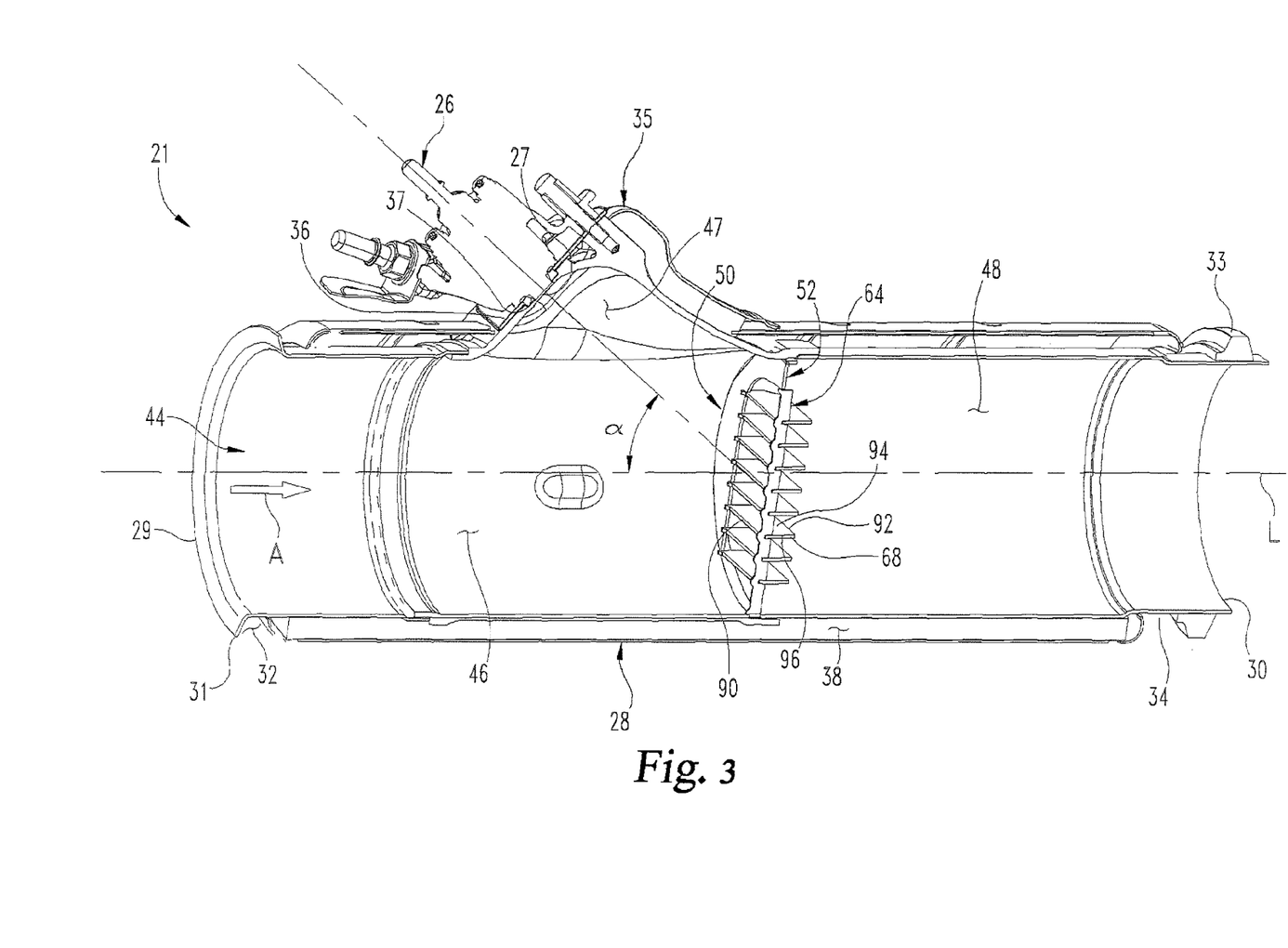
FIG. 3 is a perspective, longitudinal section view of the decomposition pipe illustrated in FIG. 2.

Elongate body 28 further includes a sidewall 38 extending around a hollow interior defining a pathway 44 extending between and opening through upstream and downstream ends 29, 30 in order to facilitate passage of exhaust gas through decomposition pipe 21 from upstream end 29 to downstream end 30 as indicated by directional arrow A in FIG. 3. Pathway 44 also generally includes a linear configuration extending along longitudinal axis L between upstream and downstream ends 29, 30. Similarly, in the illustrated form, exhaust gas directed through decomposition pipe 21 will generally flow along or in-line with longitudinal axis L. However, it should be appreciated that forms in which pathway 44 includes one or more bends or curves between upstream and downstream ends 29, 30 are also contemplated.

Pathway 44 generally includes a first portion 46, a second portion 48, and a flow restriction portion 50 positioned therebetween. More particularly, in the illustrated form, flow restriction portion 50 is defined by a flange 52 that includes portions extending inwardly into pathway 44 such that pathway 44 at flow restriction portion 50 includes a reduced cross-sectional area relative to its cross-sectional area at first portion 46 and second portion 48. Moreover, in the illustrated form, the cross-sectional area of pathway 44 is generally the same at first and second portions 46, 48, although forms in which the cross-sectional area of pathway 44 differs at first and second portions 46, 48 are also contemplated.

Figure 4:
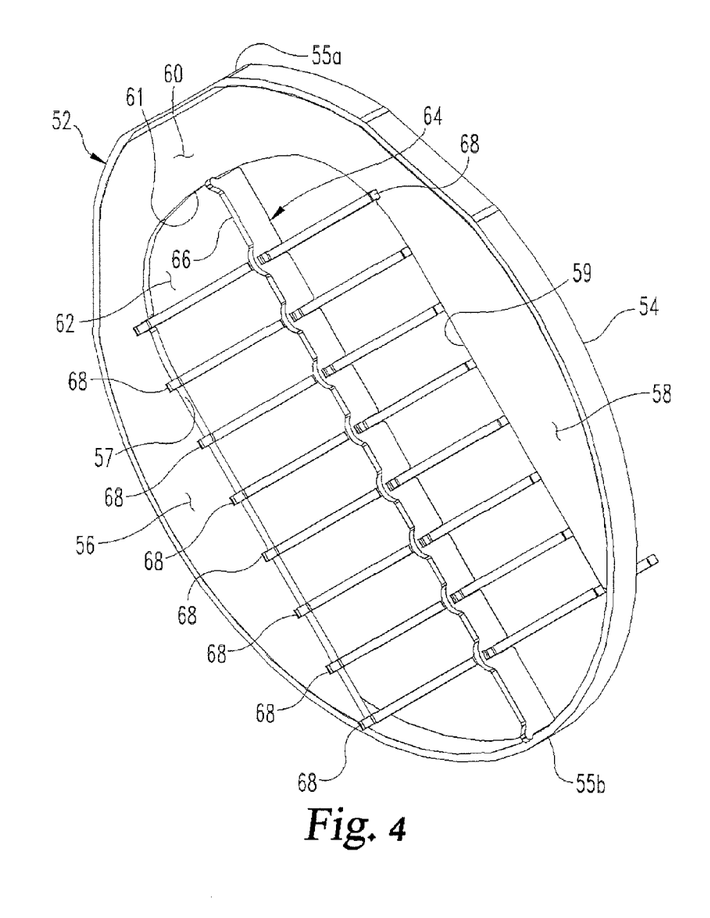
FIG. 4 is a perspective view of an internal flange member and mixing member of the decomposition tube illustrated in FIG. 2.

As illustrated in FIGS. 3-4 for example, flange 52 generally includes an outer band 54 including an upper end 55a opposite of a lower end 55b. Band 54 is further configured to be positioned against or coupled with an internal surface of sidewall 38 at flow restriction portion 50. Flange 52 further includes a pair of oppositely positioned lateral portions 56, 58 extending inwardly from band 54 and an upper portion 60 extending between lateral portions 56, 58 and inwardly from band 54. Lateral portions 56, 58 and upper portion 60 define an opening 62 having a reduced cross-sectional area relative to that of band 54. Further, lateral portions 56, 58 include edges 57, 59 that extend from upper portion 60 and terminate above lower end 55b of band 54 such that band 54 surrounds opening 62 at its lower end. Upper portion 60 includes an arcuate inner edge 61 that extends between and connects edges 57, 59 at their upper ends, while an arcuate portion of band 54 extends between and connects edges 57, 59 at their lower ends. Similarly, in the illustrated form, opening 62 generally includes an elongated oval or racetrack-shaped configuration. However, it should be appreciated that other shapes for opening 62 are also possible, including without limitation circular, square, rectangular, or hexagonal, just to provide a few possibilities.

Figure 5:
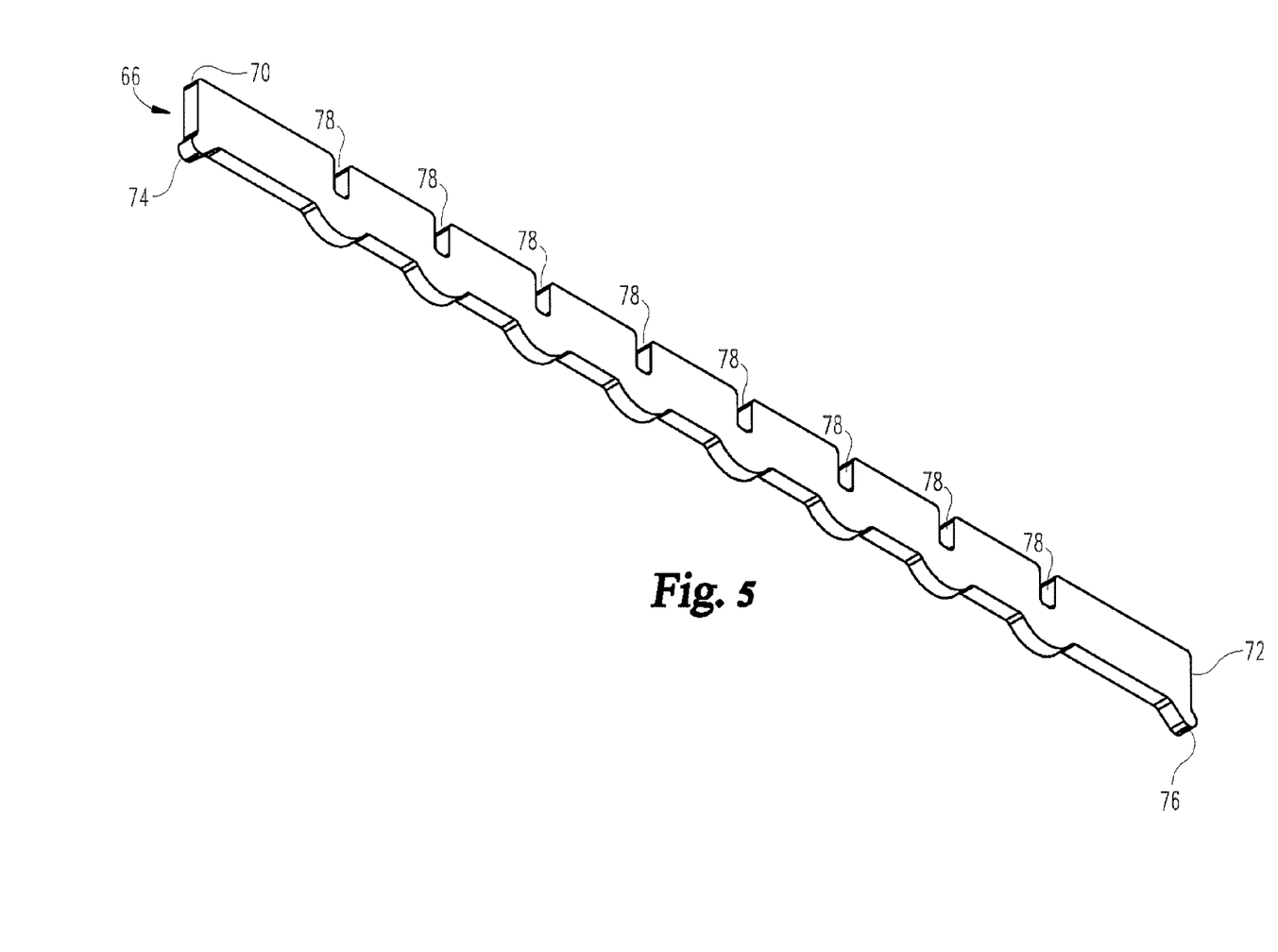
FIGS. 5 and 6 are perspective views of individual components of the mixing member illustrated in FIG. 4.

Decomposition pipe 21 also includes a mixing member 64 which is positioned in pathway 44 at flow restriction portion 50. More particularly, mixing member 64 is positioned in opening 62 of flange 52. Mixing member 64 includes a central member 66 and a plurality of spaced apart plates 68 extending transversely to central member 66. As illustrated in FIG. 5 for example, central member 66 extends between a first end 70 and an opposite second end 72 and includes a length therebetween such that first end 70 is positioned against inner edge 61 of flange 52 and second end 72 is positioned against band 54 adjacent lower end 55b. Central member 66 also includes a first projection 74 extending obliquely upstream relative to first end 70, and a second projection 76 extending obliquely upstream relative to second end 72. In the illustrated form, central member 66 is positioned relative to flange 52 such that first projection 74 cooperates with an upstream facing surface of upper portion 60 of flange 52 and second projection 76 cooperates with an upstream facing surface of band 54 adjacent lower end 55b. Central member 66 also includes a plurality of downstream facing notches 78 configured to cooperate with plates 68, further details of which will be provided below.

Figure 6:
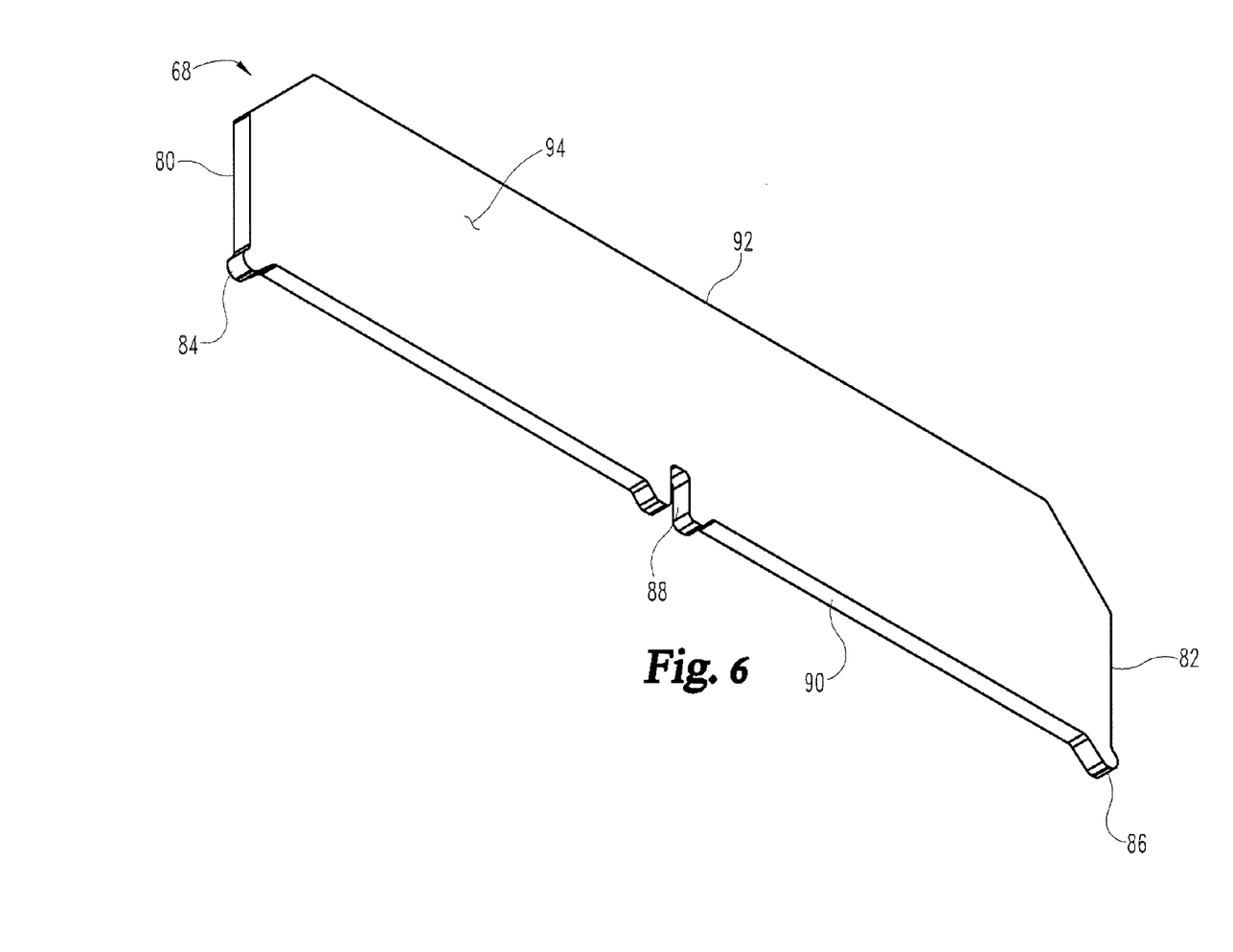

FIG. 6 provides a more detailed illustration of a representative one of plates 68. More particularly, plate 68 extends between a first end 80 and an opposite second end 82 and includes a length therebetween such that first end 80 is positioned against edge 57 of flange 52 and second end 82 is positioned against edge 59 of flange 52. Plate 68 further includes an upstream facing notch 88 structured to cooperate with a corresponding one of notches 78 on central member 66 in order to couple plates 68 with central member 66. As illustrated in FIG. 3 for example, where only a single plate has been identified to preserve clarity, a portion of each of plates 68 is positioned downstream of central member 66 when they are coupled therewith. Plate 68 also includes a first projection 84 extending obliquely upstream relative to first end 80, and a second projection 86 extending obliquely upstream relative to second end 82. In the illustrated form, plates 68 are coupled with central member 66 and positioned relative to flange 52 such that first projection 84 cooperates with an upstream facing surface of lateral portion 56 of flange 52 and second projection 86 cooperates with an upstream facing surface of lateral portion 58 of flange 52. While not previously discussed, it should be appreciated that the cooperation of first and second projections 74, 76 of central member 66 with flange 52, and the cooperation of first and second projections 84, 86 of plates 68 with flange 52, can secure mixing member 64 relative to flange 52, either in whole or in part. In addition to or in lieu of this arrangement, it should also be appreciated that mixing member 64 can be secured relative to flange 52 by one or more adhesives, fusing, welding, or other mechanical connections, just to provide a few non-limiting possibilities.

As illustrated in FIG. 3 for example, each of plates 68 generally extends in-line with or parallel to longitudinal axis L and the direction of exhaust gas flow through pathway 44. More particularly, each of plates 68 includes an upstream facing surface 90, an oppositely positioned downstream facing surface 92, and a pair of oppositely positioned upper and lower surfaces 94, 96, respectively, that extend between upstream and downstream facing surfaces 90, 92 and generally in-line or parallel with longitudinal axis L. Similarly, in this arrangement only upstream facing surface 90 of plates 68 will directly face into the exhaust gas flow through pathway 44. In other non-illustrated forms, it is contemplated that one or more of plates 68 could be deviated, i.e. extend in a non-parallel fashion, relative to the exhaust gas flow through pathway 44, provided that such deviation does not result in excess exhaust flow restriction through flow restriction portion 50.

In the illustrated form, upstream facing surfaces 90 of each of plates 68 are aligned with one another in an upstream/downstream direction, although forms in which plates 68 are arranged with upstream facing surfaces 90 staggered relative to one another in an upstream/downstream direction are also possible. Plates 68 are generally solid between upper and lower surfaces 94, 96, although forms in which one or more of the plates includes one or more openings between upper and lower surfaces 94, 96 or is otherwise porous are also contemplated.

While not previously discussed, it should be understood that alternative configurations for mixing member 64 are possible. For example, in one non-illustrated form, mixing member 64 may be in the form of material that has a honeycomb or grid-type of arrangement that includes a plurality of openings extending therethrough. In this form, the openings may be positioned parallel to the direction of exhaust gas passage through decomposition pipe 21 as indicated by directional arrow A in FIG. 3.

Figure 2:
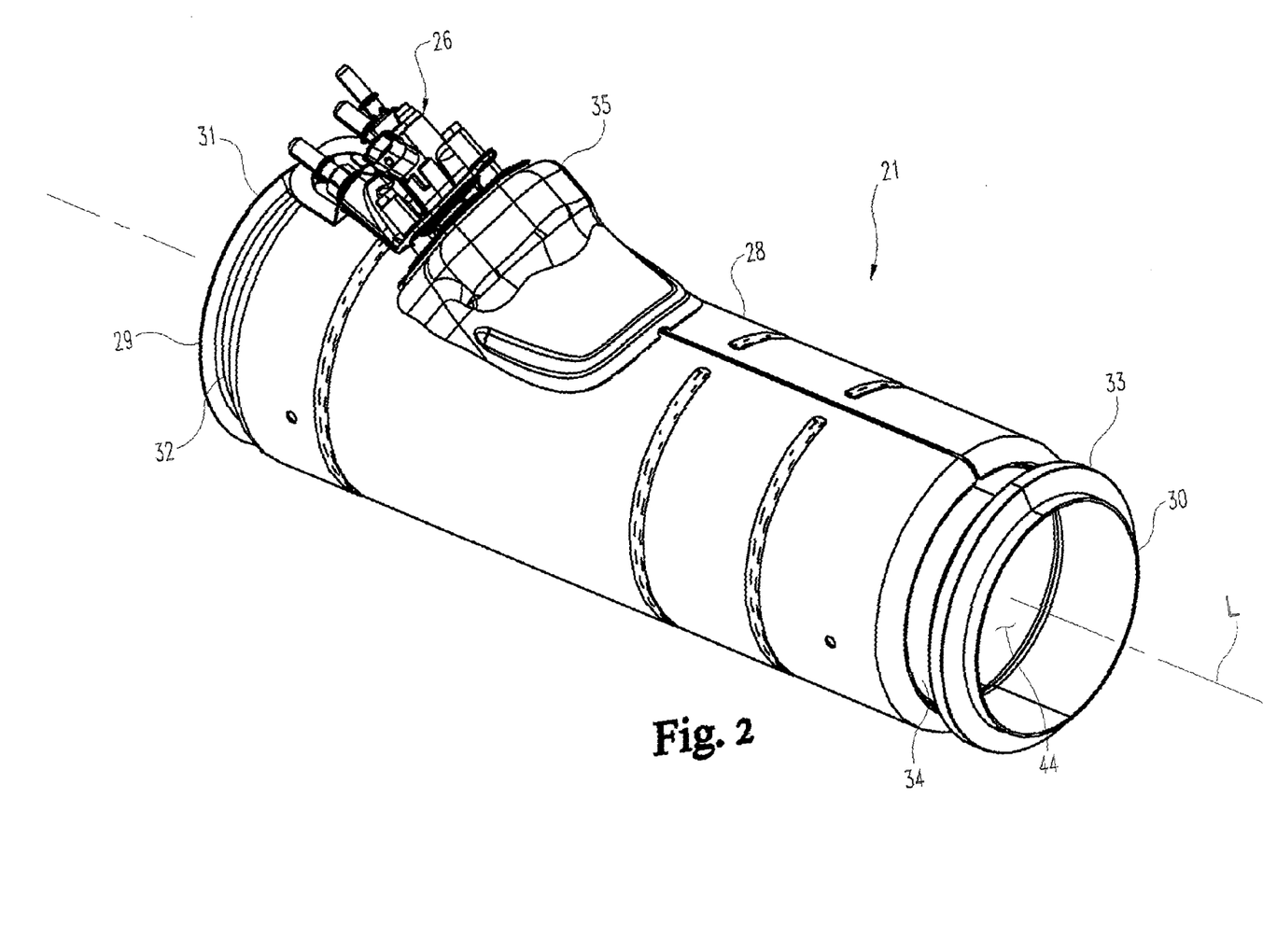
FIG. 2 is a perspective view of one embodiment decomposition pipe configured for use in the exhaust aftertreatment system of FIG. 1.

Elongate body 28 of decomposition pipe 21 also includes an upwardly projecting mounting portion 35 positioned upstream of flow restriction portion 50 and including a mounting surface 36 extending obliquely relative to longitudinal axis L in a downstream direction. An aperture 37 extends through mounting portion 35 at mounting surface 36 into communication with offset portion 47 of pathway 44, which is generally positioned above the main exhaust gas flow through decomposition pipe 21. Mounting surface 36 is generally structured to facilitate mounting of reductant injector 26 on elongate body 28 with an injection end 27 of reductant injector 26 being positioned in communication with offset portion 47 of pathway 44. Similarly, in this arrangement, injection end 27 of reductant injector 26 is generally sheltered or protected from the main exhaust gas flow through decomposition pipe 21.

Reductant injector 26 extends at a deviated angle α relative to longitudinal axis L, and the exhaust gas flow through flow restriction portion 50, which can be between 15 and 60 degrees, although other variations for the value of angle α are also possible. Injection end 27 of reductant injector 26 can be provided with a nozzle or other spray controlling element that is structured to provide a spray of reductant into pathway 44 such that all or substantially all of the reductant impinges on mixing member 64 and is subsequently dispersed into the exhaust gas flow. While not previously discussed, it should be appreciated that the form of reductant injector 26 shown in FIGS. 2 and 3 is illustrative only, and that any suitable form of reductant injector 26 could be used in system 10.

During operation of system 10, the velocity of exhaust gas directed through decomposition pipe 21 is increased as it flows through flow restriction portion 50 and across mixing member 64. This increase in velocity can, amongst other things, provide mixing member 64 with a surface temperature suitable for supporting decomposition of the reductant injected by reductant injector 26 such that the likelihood of liquid or solid deposits of un-decomposed reductant on mixing member 64 and/or other portions of decomposition pipe 21 is reduced. In addition, the velocity increase may also create exhaust turbulence at flow restriction portion 50 or an adjacent location downstream of flow restriction portion 50. Amongst other things, this turbulence can facilitate mixing of the reductant with the exhaust, thereby improving dispersion of the reductant. Moreover, while not previously discussed, it should also be appreciated that the enlargement of pathway 44 at second portion 48 relative to flow restriction portion 50 allows the velocity of the exhaust gas downstream of flow restriction portion 50 to be reduced, thereby providing sufficient residence time of the reductant to promote complete decomposition of the reductant before the exhaust gas enters $NO_x$ reduction catalyst 22. In addition to or in lieu of having an enlarged second portion 48 relative to flow restriction portion 50, it should also be appreciated that system 10 can be arranged such that the distance between flow restriction portion 50 and $NO_x$ reduction catalyst 22 provides sufficient residence time to promote complete decomposition of the reductant before the exhaust gas enters $NO_x$ reduction catalyst 22.

As indicated above, reductant injector 26 is structured to provide a spray of reductant into pathway 44 such that all or substantially all of the reductant impinges on mixing member 64. Amongst other things, this arrangement tends to prevent the impingement and pooling of the reductant along the internal surfaces of sidewall 38, which in turn reduces the likelihood that any un-decomposed reductant deposits will be formed on the internal surfaces of sidewall 38.

Figure 7:
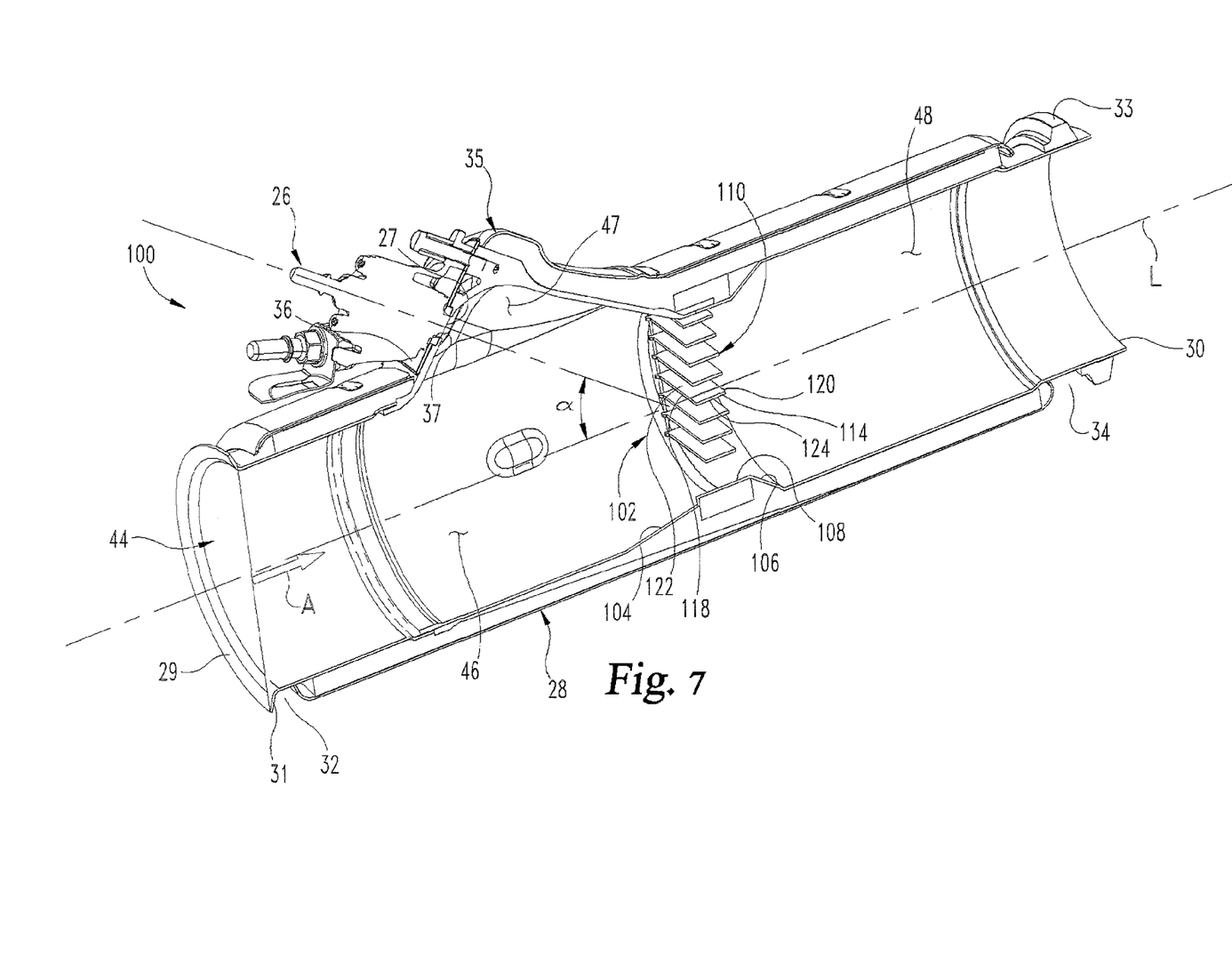
FIG. 7 is a perspective, longitudinal section view of an alternative embodiment decomposition pipe configured for use in the system of FIG. 1.

An alternative embodiment decomposition pipe 100 that can be used in system 10 is illustrated in section view in FIG. 7, where like numerals refer to like features previously described. Decomposition pipe 100, with the exception of flow restriction portion 102 and mixing member 110 which are alternatively arranged relative to flow restriction portion 50 and mixing member 64 of decomposition pipe 21, is substantially similar to decomposition pipe 21. Similarly, except as otherwise herein provided below, the description provided above in connection with decomposition pipe 21 will generally also be applicable to decomposition pipe 100.

Flow restriction portion 102 includes a first surface 104 extending inwardly from sidewall 38 in a downstream direction and obliquely to longitudinal axis L and the direction of exhaust gas flow through flow restriction portion 102, which in the illustrated form is substantially in-line with longitudinal axis L. A second surface 106 of flow restriction portion 102 is positioned downstream of first surface 104 and extends inwardly from sidewall 38 in an upstream direction and obliquely to longitudinal axis L and the direction of exhaust gas flow through flow restriction portion 102. In the illustrated embodiment, first and second surfaces 102, 104 extend relative to longitudinal axis L and the direction of exhaust gas flow through flow restriction portion 102 at different angles. More particularly, first surface 102 extends relative to longitudinal axis L and the direction of exhaust gas flow through flow restriction portion 102 at a smaller angle of inclination than does second surface 104. Flow restriction portion 102 further includes a third surface 108 that extends between first and second surfaces 104, 106 and in-line with or parallel to longitudinal axis L and the direction of exhaust gas flow through flow restriction portion 102. In other non-illustrated forms, it is contemplated that flow restriction portion 102 can be provided without a linear surface extending between first and second surfaces 104, 106 such that first and second surfaces 104, 106 intersect with one another at an apex. While not previously discussed, it should be appreciated that pathway 44 at flow restriction portion 102 includes a reduced cross-sectional area relative to its cross-sectional area at first portion 46 and second portion 48. In addition, in the illustrated form, pathway 44 generally includes a circular cross-sectional shape at flow restriction portion 102, although other cross-sectional shapes for pathway 44 at flow restriction portion 102 are also possible.

Figure 8:
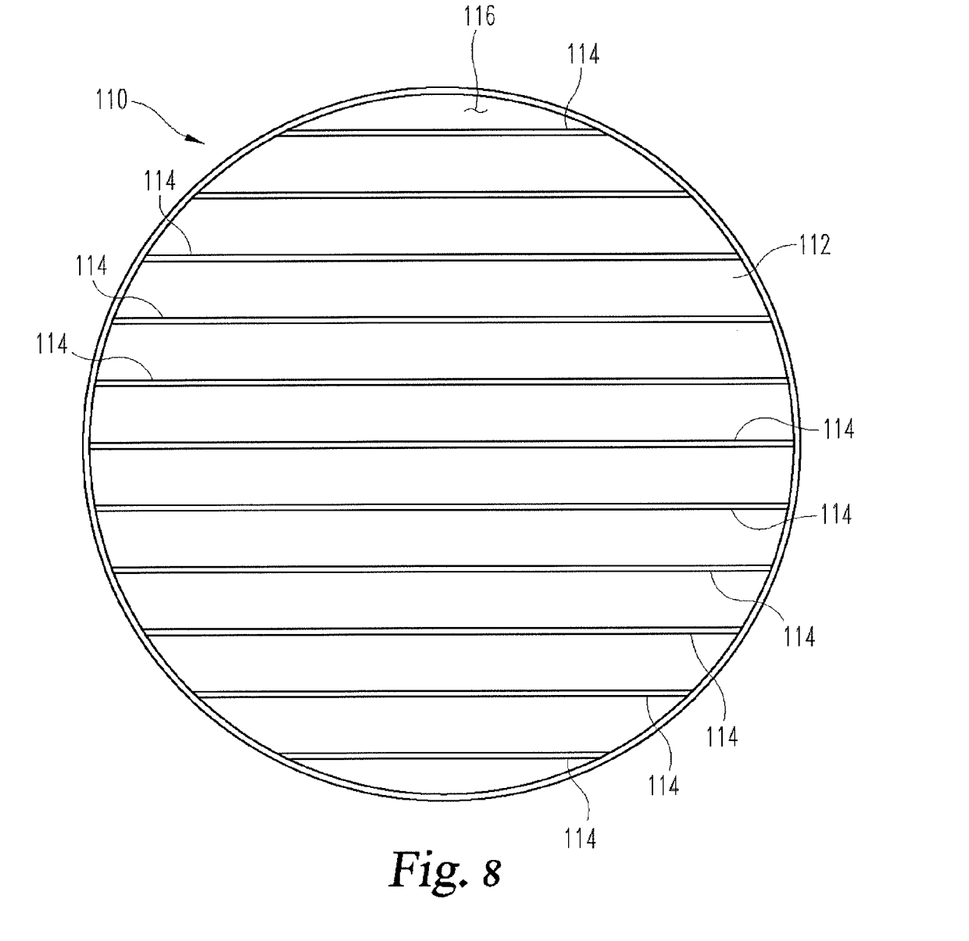
FIG. 8 is a plan view of a mixing member of the decomposition pipe illustrated in FIG. 7.

Mixing member 110 is positioned in flow restriction portion 102 between first and second surfaces 104, 106. As illustrated in FIG. 8 for example, mixing member 110 includes an outer band or member 112 which surrounds an opening 116 and can be fixed to the internal surface of sidewall 38 in any suitable fashion. Mixing member 110 also includes a plurality of spaced apart plates 114 each of which is coupled on opposite ends to outer member 112 and extends across opening 116. As illustrated in FIG. 7 for example, where only a single plate 114 has been identified to preserve clarity, each of plates 114 generally extends in-line with or parallel to longitudinal axis L and the direction of exhaust gas flow through pathway 44. More particularly, each of plates 114 includes an upstream facing surface 118, an oppositely positioned downstream facing surface 120, and a pair of oppositely positioned upper and lower surfaces 122, 124, respectively, that extend between upstream and downstream facing surfaces 118, 120 and generally in-line or parallel with longitudinal axis L. Similarly, in this arrangement only upstream facing surface 118 of each of plates 114 will directly face into the exhaust gas flow through pathway 44. In other non-illustrated forms, it is contemplated that one or more of plates 114 could be deviated, i.e. extend in a non-parallel fashion, relative to the exhaust gas flow through pathway 44, provided that such deviation does not result in excess exhaust flow restriction through flow restriction portion 102.

In the illustrated form, upstream facing surfaces 118 of each of plates 114 are aligned with one another in an upstream/downstream direction, although forms in which plates 114 are arranged with upstream facing surfaces 118 staggered relative to one another in an upstream/downstream direction are also possible. Plates 114 are generally solid between upper and lower surfaces 122, 124, although forms in which one or more of the plates includes one or more openings between upper and lower surfaces 122, 124 or is otherwise porous are also contemplated. Injection end 27 of reductant injector 26 can be provided with a nozzle or other spray controlling element that is structured to provide a spray of reductant into pathway 44 such that all or substantially all of the reductant impinges on mixing member 110 and is subsequently dispersed into the exhaust gas flow. It should also be understood that mixing member 110 could be provided with alternative configurations similar to those discussed above in connection with mixing member 64.

During operation of system 10 in which decomposition pipe 100 is incorporated, the velocity of exhaust gas directed through decomposition pipe 100 begins to increase as it comes into contact with first surface 104 of flow restriction portion 102. Similarly, in this arrangement, an increase in the velocity of the exhaust gas is initiated upstream of mixing member 110. This increase in velocity can, amongst other things, provide mixing member 110 with a surface temperature suitable for supporting decomposition of the reductant injected by reductant injector 26 such that the likelihood of liquid or solid deposits of un-decomposed reductant on mixing member 110 and/or other portions of decomposition pipe 100 is reduced. In addition, the velocity increase may also create exhaust turbulence at flow restriction portion 102 or an adjacent location downstream of flow restriction portion 102. Amongst other things, this turbulence can facilitate mixing of the reductant with the exhaust, thereby improving dispersion of the reductant. Moreover, while not previously discussed, it should also be appreciated that the enlargement of pathway 44 at second portion 48 relative to flow restriction portion 102 allows the velocity of the exhaust gas downstream of flow restriction portion 102 to be reduced, thereby providing sufficient residence time to promote complete decomposition of the reductant before the exhaust gas enters $NO_x$ reduction catalyst 22. In addition to or in lieu of having an enlarged second portion 48 relative to flow restriction portion 102, it should also be appreciated that system 10 can be arranged such that the distance between flow restriction portion 102 and $NO_x$ reduction catalyst 22 provides sufficient residence time to promote complete decomposition of the reductant before the exhaust gas enters $NO_x$ reduction catalyst 22.

As indicated above, reductant injector 26 is structured to provide a spray of reductant into pathway 44 such that all or substantially all of the reductant impinges on mixing member 110. Amongst other things, this arrangement tends to prevent the impingement and pooling of the reductant along the internal surfaces of sidewall 38, which in turn reduces the likelihood that any un-decomposed reductant deposits will be formed on the internal surfaces of sidewall 38.

As is evident from the figures and text presented above, a variety of embodiments according to the present invention are contemplated.

In one embodiment, an apparatus for treating exhaust includes a reductant injector, an aftertreatment component including a $NO_x$ reduction catalyst, and a pathway for directing the exhaust the aftertreatment component. The pathway includes a constriction zone within which is positioned a mixing member. The constriction zone begins downstream of the reductant injector and upstream of the aftertreatment component.

In another embodiment, a system includes an internal combustion engine, an exhaust flowpath fluidly coupled to the internal combustion engine, an aftertreatment component disposed in the exhaust flowpath downstream of the internal combustion engine and including a $NO_x$ reduction catalyst. The system also includes a conduit disposed in the exhaust flowpath and including an internal passage. The internal passage further includes a flow restricting portion. A reductant injector is coupled with the conduit upstream of the flow restricting portion and extends at a deviated angle to a flow direction of the exhaust flowpath through the flow restricting portion of the internal passage.

In still another embodiment, an article of manufacture includes a body extending between a proximal end and an opposite distal end. A flow pathway extends through the body from a proximal opening through the proximal end to a distal opening through the distal end and includes a flow restriction zone. The article also includes a mounting portion offset from the flow restriction zone in a proximal-distal direction and structured to facilitate mounting of a reductant injector on the body and in communication with the flow pathway. A mixing member is positioned in the flow restriction zone.

In yet another embodiment, a method includes providing an internal combustion engine fluidly coupled to an exhaust flowpath; providing an exhaust aftertreatment system including a first aftertreatment component disposed in the exhaust flowpath, a second aftertreatment component disposed in the exhaust flowpath downstream of the first aftertreatment component and including a $NO_x$ reduction catalyst, and a conduit disposed in the exhaust flowpath between the first and second aftertreatment components and including a mixing member positioned therein; directing exhaust through an upstream end of the conduit from the first aftertreatment component; and initiating an increase in velocity of the exhaust downstream from the upstream end of the conduit and upstream from the mixing member.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus for treating exhaust, comprising:
   a reductant injector;
   an aftertreatment component including a $NO_x$ reduction catalyst; and
   a pathway for directing said exhaust to said aftertreatment component, said pathway including a constriction zone within which is positioned a mixing member, said constriction zone beginning downstream of said reductant injector and upstream of said aftertreatment component, wherein the pathway includes a first surface upstream of and abutting the mixing member obliquely angled relative to a flow direction of said exhaust through said constriction zone and wherein the first surface defines a boundary of the pathway in a direction towards the mixing member.

2. The apparatus of claim 1, wherein said pathway further includes a first portion upstream of said constriction zone, a second portion downstream of said constriction zone, and a reduced cross-sectional area in said constriction zone relative to said first and second portions.

3. The apparatus of claim 1, wherein said constriction zone is defined by an inwardly extending flange extending around said mixing member.

4. The apparatus of claim 3, wherein said mixing member includes a plurality of spaced apart plates extending between opposite sides of said flange.

5. The apparatus of claim 1, wherein said constriction zone includes a second surface downstream of the mixing member, obliquely angled relative to a flow direction of said exhaust through said constriction zone, said second surface extending into defining a boundary of the pathway in a direction towards the mixing member.

6. The apparatus of claim 5, wherein said constriction zone further includes a third surface extending between said first and second surfaces and in said flow direction.

7. The apparatus of claim 5, wherein said mixing member is positioned between said first and second surfaces.

8. The apparatus of claim 1, wherein said pathway is structured to direct said exhaust across said mixing member.

9. The apparatus of claim 1, wherein said mixing member includes a plurality of spaced apart plates.

10. The apparatus of claim 9, wherein said plates extend in a flow direction of said exhaust through said constriction zone.

11. The apparatus of claim 1, wherein said reductant injector is obliquely angled relative to a flow direction of said exhaust through said constriction zone.

12. The apparatus of claim 1, wherein said constriction zone is structured to initiate a velocity increase of said exhaust downstream of said reductant injector.

13. The apparatus of claim 12, wherein said constriction zone is further structured to initiate said velocity increase of said exhaust upstream of said mixing member.

14. A system, comprising:
   an internal combustion engine;
   an exhaust flowpath fluidly coupled to said internal combustion engine;
   an aftertreatment component disposed in said exhaust flowpath downstream of said internal combustion engine, said component including a $NO_x$ reduction catalyst;
   a conduit disposed in said exhaust flowpath and including an internal passage, said internal passage including a flow restricting portion, wherein said flow restricting portion includes a reduced cross-sectional area at least partially defined by first and second surfaces obliquely angled relative to a flow direction of said exhaust flowpath through said flow restricting portion, said first surface defining a first boundary of the internal passage in a direction toward the aftertreatment component and said second surface defining a second boundary of the internal passage in a direction away from the aftertreatment component, the first surface being disposed upstream of the second surface and wherein the first surface is formed on an inner surface of the conduit; and a reductant injector coupled with said conduit upstream of said flow restricting portion, wherein said reductant injector extends at a deviated angle to a flow direction of said exhaust flowpath through said flow restricting portion of said internal passage.

15. The system of claim 14, further comprising a mixing member positioned in said flow restricting portion.

16. The system of claim 15, wherein said mixing member includes a plurality of spaced apart plates.

17. The system of claim 16, wherein said plates extend in a flow direction of said exhaust flowpath through said flow restricting portion.

18. The system of claim 15, wherein said reductant injector is further structured to direct a reductant dosage into contact with said mixing member.

19. The system of claim 14, wherein said deviated angle is between 15 degrees and 60 degrees.

20. The system of claim 14, wherein said flow restricting portion of said internal passage includes a reduced-cross sectional area at least partially defined by an inwardly extending flange.

21. The system of claim 14, wherein said reductant injector includes an injection end in communication with said internal passage of said conduit at a location offset from a main stream of said exhaust flowpath.

22. The system of claim 12, further comprising a particulate filter positioned upstream of said aftertreatment component.

23. An article of manufacture, comprising:
a body extending between a proximal end and an opposite distal end;
a flow pathway extending through said body from a proximal opening through said proximal end to a distal opening through said distal end and including a flow restriction zone;
a mounting portion offset from said flow restriction zone in a proximal-distal direction and structured to facilitate mounting of a reductant injector on said body and in communication with said flow pathway; and
a mixing member positioned in said flow restriction zone, wherein said flow restriction zone is structured to initiate a velocity increase of a fluid being passed through said body at a location proximal of a flange associated with said mixing member,
wherein the flow pathway includes a first surface upstream of and abutting the mixing member obliquely angled relative to a flow direction of exhaust through the flow restriction zone, wherein the first surface defines a boundary of the flow restriction zone in a direction towards the mixing member and a second surface downstream of and abutting the mixing member obliquely angled relative to the flow direction of the exhaust through the flow restriction zone wherein the second surface defines a boundary of the flow restriction zone in a direction away from the mixing member.

24. The article of manufacture of claim 23, wherein said mixing member includes a plurality of spaced apart mixing elements positioned in said flow restriction zone and extending substantially parallel to a portion of said flow pathway extending through said flow restriction zone.

25. The article of manufacture of claim 24, wherein each of said plurality of mixing elements includes a proximal facing surface and an opposite distal facing surface, said proximal facing surfaces being aligned with one another in a proximal-distal direction.

26. The article of manufacture of claim 23, wherein said flow restriction zone includes a reduced cross-sectional area at least partially defined by an inwardly extending flange.

27. The article of manufacture of claim 23, wherein said mounting portion extends upwardly from said flow pathway.

28. A method, comprising:
providing an internal combustion engine fluidly coupled to an exhaust flowpath;
providing an exhaust aftertreatment system including a first aftertreatment component disposed in said exhaust flowpath, a second aftertreatment component disposed in said exhaust flowpath downstream of said first aftertreatment component and including a $NO_x$ reduction catalyst, and a conduit disposed in said exhaust flowpath between said first and second aftertreatment components $NO_x$ reduction catalyst and including a mixing member positioned therein;
directing exhaust through an upstream end of said conduit from said first aftertreatment component; and
initiating an increase in velocity of said exhaust downstream from said upstream end of said conduit and upstream from a component associated with securing said mixing member within the conduit,
wherein the exhaust flowpath includes a first surface upstream of and abutting the mixing member obliquely angled relative to a flow direction of the exhaust flowpath, wherein the first surface defines a boundary of the exhaust flowpath in a direction towards the mixing member and a second surface downstream of and abutting the mixing member obliquely angled relative to the flow direction of the exhaust flowpath wherein the second surface defines a boundary of the flow restriction zone in a direction away from the mixing member.

29. The method of claim 28, which further includes injecting a reductant dosage into said conduit.

30. The method of claim 29, wherein injecting said reductant dosage into said conduit includes directing said reductant dosage onto said mixing member.

31. The method of claim 28, wherein said mixing member includes a plurality of spaced apart plates extending in-line with a flow direction of said exhaust through said conduit.

* * * * *